Oct. 8, 1974 KIYOSHI INOUE 3,840,450

METHOD OF DIFFUSING SUBSTANCES INTO SURFACE ZONES OF CONDUCTIVE BODIES

Original Filed Aug. 14, 1969 2 Sheets-Sheet 1

United States Patent Office 3,840,450
Patented Oct. 8, 1974

3,840,450
METHOD OF DIFFUSING SUBSTANCES INTO SURFACE ZONES OF CONDUCTIVE BODIES

Kiyoshi Inoue, 100 Sakato, Kawasaki, Kanagawa, Japan

Continuation of abandoned application Ser. No. 850,162, Aug. 14, 1969, which is a continuation-in-part of application Ser. No. 405,051, Oct. 20, 1964, now Patent No. 3,481,839. This application Nov. 2, 1971, Ser. No. 195,055
Claims priority, application Japan, Oct. 21, 1963, 38/55,819; Feb. 3, 1964, 39/5,506
The portion of the term of the patent subsequent to Mar. 31, 1987, has been disclaimed
Int. Cl. C23b *13/00*
U.S. Cl. 204—181 14 Claims

ABSTRACT OF THE DISCLOSURE

A method of diffusing a substance into a conductive body wherein the body is immersed in a conductive liquid and juxtaposed with a counterelectrode while the substance is distributed in the body and a unidirectional field is applied between the substrate and the electrode. This unidirectional field serves to produce a drift of the substance toward the surface of the substrate at which surface the substance is activated to form ionic species whose penetration of the substance is promoted by the superimposition of a high-frequency pulsating field upward of 10 kHz. and up to the order of mHz. to 10 mHz., upon the unidirectional (D.C.) field. Preferably, the substance is introduced into the conductive liquid which forms a solution thereof.

This is a continuation of application Ser. No. 850,162, filed Aug. 14, 1969, now abandoned, which in turn is a continuation-in-part of my application Ser. No. 405,051, filed Oct. 20, 1964 now Pat. No. 3,481,839 and entitled "Method of Depositing Substances on and Diffusing Them Into Conductive Bodies Under High-Frequency Electric Field."

The present invention relates to a method of depositing substances on and diffusing them into surface zones of conductive bodies, especially metals, and to a system in which the diffusion of such substances into the body is controlled and/or localized.

As pointed out in the aforementioned copending application, my earlier Pats. Nos. 3,250,892 and 3,340,052 discussed a method of depositing substances upon a conductive body whereby the energy required by bonding the substances to the body is obtained from electrical pulses, i.e. in the form of an electric-spark discharge.

In U.S. Pats. Nos. 3,098,151, 3,198,675 and 3,232,747, some of which issued on applications copending with application Ser. No. 405,051, it is pointed out that electrolytes can be used for the heating of conductive bodies for various purposes. Electrolytic heating of the bodies is effected by passing an electric current through an electrolyte between the body to be heated and a counter-electrode spacedly juxtaposed therewith. Similarly, in the systems described in Pats. Nos. 3,250,892 and 3,340,052, electric fields are used via spark discharge to deposit the substance upon the conductive body and then to cause re-formation of the crystal lattice of the conductive body at least in part by diffusion of a deposited substance into the interstices of the crystal lattice of the body.

In application Ser. No. 405,051, I describe a method of diffusing substances into a conductive body, after they have been deposited on the surface of the latter which involves generating sufficient heat at the electrolyte/substrate interface to permit partial diffusion or interdiffusion at this interface by means of electrical energy. The penetration of the crystal lattice of the substrate by the deposited substance is facilitated by the use of high-frequency fields, whose purposes will be discussed in greater detail hereinafter.

It is an important object of the present invention, therefore, to extend principles originally set forth in application Ser. No. 405,051, and provide an improved method of controllingly diffusing selected substances into a conductive substrate.

Another object of this invention is to provide a method of selectively diffusing substances into the localized surface zones of controlled depth using simple sources of the diffusible substance.

A further object of this invention is to provide a method of diffusing elemental materials, e.g. nitrogen, carbon or sulfur, into the lattice of a conductive substrate, especially metals.

Yet a further object of the invention is the provision of an improved method for the carbonization, nitrification, etc. of metallurgical substrate such as steel.

The invention provides for the combined deposition at the surface of the substrate and diffusion into a limited surface zone thereof, of ionic species or fragments containing the element or elements capable of penetrating the lattice. Thus according to one specific feature of the present invention, anions of a soluble salt, preferably an anion consisting of the element to be diffused in combination with oxygen, may be considered to migrate under the use of an essentially unidirectional electric field to deposit on the substrate. At the surface of the substrate, the deposited anion can be fragmented by electrical discharge energy or electrically produced thermal energy, the fragments containing the diffusion element being then induced to migrate into the substrate by an applied potential gradient. Continuance of the current flow subsequent to the deposition and decomposition of the anions and the application of a unidirectional field results in a penetration of elemental fragments into the lattice structure.

Surprisingly, this elemental diffusion into a lattice structure takes place not only at the anode but also at the cathode, especially when a high-frequency alternating current is superimposed on the direct current which forms the aforementioned potential gradient. This result is believed to be due to the fact that some deposition of the compounds containing the active ions occurs at the cathode as a result of the thermal energy developed at the interface. The energy activating the diffusion appears to derive at least in part from a heating of the surface region of the electrode.

According to still another feature of the present invention, the electrolyte is a solution, preferably in an aqueous solvent, of an organic or inorganic salt, rather than a fused bath or the like as has hitherto been necessary in many instances for diffusion of substances into metallic substrate. The salt, whose anions and cations respectively migrate to the anode and cathode across which the direct current is applied, may decompose to provide respective diffusible elements capable of penetrating the respective lattice. Thus a steel body can be "case-hardened" in an electrolyte having anions containing carbon (e.g. acetate, carbonate or bicarbonate). When it is desired to increase the sulfur content of a surface zone of, for example, a steel or molybdenum body to reduce the sliding friction of the surface or otherwise modify the surface to increase the sulfur content, the source of sulfur in the electrolyte can be a sulfite, sulfide or sulfate anion or a salt or other substance soluble in the liquid medium. Sulfate ions pose a problem in that their high-thermal stability makes it difficult to effect breakdown of the ion to form the diffusable element (sulfur). Also, the electrolyte can be provided with anions having a high proportion of available sulfur, preferably thiosulfate anions, sulfide (e.g. ammonium sulfate or an organic sulfide such as methyl mercaptan).

Nitrification or nitriding of a metallic body can be effected using electrolyte solutions containing nitrate, nitrite or other nitrogen-containing anions in combination with nitrogen-containing cations such as ammonium ions.

It has been found that, in accordance with an important feature of the invention, the rate of elemental penetration into the surface zone of a metallic body, the depth of penetration or the localization of penetration can be sharply increased and controlled through the use of alternating current of high frequency superimposed upon the direct-current heating and potential gradient source. The significance of high-frequency alternating current (which according to the principles of the present invention should have a frequency in the megacycle range (up to 10 mMz.) and not less than about 10 kMz.) is that it prevents fouling of the electrode surfaces, breaks down any ion barrier or polarization layer and otherwise greatly facilitates control of penetration. It is interesting to note that in other systems, the use of altenating current is made to prevent deposition upon a surface and thus it is indeed surprising and totally unexpected that the use of high-frequency alternating current in the present system, will permit control of the depth or penetration of deposited substances. While it is believed that the effect of the high-frequency alternating current is a consequence of a reduction in the barrier energy with which a particle must be provided to penetrate the lattice of the substrate, it is by no means certain and applicant does not wish to be bound by any theory in this regard. It may be observed, however, that penetration of a crystal lattice from the exterior may be considered analogous to the overcoming of the work function of emission of an electron from a surface in photo-activated systems; in both cases a characteristic energy must be supplied before the event can be induced to occur. The use of high-frequency alternating current in superimposition upon the direct current appears to reduce this characteristic energy restricting penetration of the lattice so that penetration occurs more rapidly, with greater facility of control and to a more uniform extent in the localized areas subjected to the high-frequency field.

In the foregoing discussion and in the detailed description hereinafter, it should be borne in mind that the present system involves an electrolytic type of diffusion in which a liquid serves as a current carrier and also as a source of the diffusable substance which is soluble in this carrier and, moreover, as a source of a gas layer between the liquid and substitute surfaces. In the carbonization process, such solutes as organic or potassium acetate, sodium acetate, ammonium acetate, calcium acetate, potassium formate, sodium formate and ammonium formate, have been found to be highly satisfactory in water as the solvent and carrier. When organic solvents are used, they may be formic acid, acetic acid, lauric acid, methanol, dodecanol, isoamylalcohol, ethylene glycol, glycerin, polyethylene glycol, paraldehyde, acrylic acid, acrylalcohol, acetone, acetonylalcohol, acetophenone and methylethylketone; the organic solutes used with these organic solvents may be potassium formate, sodium formate, ammonium formate, sodium oxalate, potassium oxalate, sodium acetate, potassium carbonate, sodium carbonate, potassium acetate, potassium chloride, sodium chloride, ammonium chloride, potassium nitrite, potassium nitrate, sodium nitrite, sodium nitrate, potassium silicate, sodium silicate, potassium silicofluoride, sodium silicofluoride, sodium sulfate, sodium phosphate, formic acid, oxalic acid, acetic acid, tartaric acid, citric acid and phosphoric acid. Carbon particles can also be dispersed in the liquid medium and preferably are of submicroscopic size. Ethanol and other low-molecular weight alcohols ($C_1$–$C_6$), glucose, saccharose, maltose and sugars with carbon numbers of $C_6$ to $C_{12}$ may also be used as carbonization agents in low conductivity aqueous electrolytes, e.g. containing potassium acetate to impart conductivity.

Where nitrification is desired, it is appropriate to use one or more of the nitrogen-containing solutes listed above in combination with water or formaldehyde as a solvent or solvents such as acid amides and amines. Suitable solvents of these latter types include formamide dimethylformamide, methylamine, aniline, methylaniline, dimethylaniline and amylamine. Urea may be used as a source of nitrogen incorporated into one of these solvent/solute combinations set forth above. Depending, of course, on the composition of the system, carbonization or nitrification (nitriding) may be carried out individually or the substance may be subjected to both carbonization and nitriding in a process which may be termed "carbonitrification."

When sulfurization is desired, the liquid may include a sulfur-containing solution such as sodium thiosulfate, as mentioned earlier, sulfonic acids, hydrogen sulfides, sulfur oxides or submicroscopic particles of sulfate. In addition to water, suitable solvents include methyl sulfide, ethyl sulfide and like sulfur-containing solvents as well as non-sulfur solvents in which a sulfur compound is introduced or a nonconductive sulfur-containing solvent in which a nonsulfur solute is provided to render the liquid electrically conductive.

Similarly, boriding (introducing elemental boron into the crystal lattice in a manner analogous to the incorporation of nitrogen) vanadizing, tungstenizing or molybdenizing (alloying vanadium, tungsten or molybdenum with the substrate at selected surface zone) or like processes can be effected without fused-salt baths by using solutes or solvents which contain the respective elements. For example, boriding may be carried out with boric acid or ammonium borate in aqueous solution while sodium metavanadate, sodium tungstenate and sodium molybdenate may be used for vanadizing, tungstenizing or molybdenizing the substrate. Powders containing the respective elements may also be employed in a dispersion in the electrolytic solution.

In accordance with the principles of this invention, a gaseous discharge atmosphere is formed upon the workpiece surface. Cathodic reaction and the aforementioned evolution of heat at the interface of the cathode and the electrolyte cause a decomposition of the electrolyte and/or any solute contained therein to form a gaseous layer which permits the development of a stable discharge in which ionization of the species to be difused is produced by the discharge and upon further disintegration of the components carried to the electrode or substrate. The discharge layer of gas is found to contain a high concentration of highly activated ions or ionic species capable of diffusion into the substrate and to be of a thickness of the order of milimeters. Investigations have shown that this blanket of gas between the liquid phase (solvent/solute electrolyte) and the solid phase (substrate) may have three layers including a cathodic-fall region against the substrate surface, an intermediate arc region outwardly of the cathodic-fall region, and an anodic-fall region at the gas/liquid interface. In the diffusion process of the present invention, the potential gradient of the gaseous discharge layer and particularly its cathodic-fall region plays an important role and in fact is critical. Successful diffusion requires the potential gradient across the cathodic-fall region to the greater than $10^4$ volts/cm. and preferably more than $10^6$ volts/cm., while the thickness of the cathodic-fall region should be from $10^{-3}$ to $10^{-6}$ cm.

In the cathodic-fall region, electrons emitted from the cathodic workpiece surface are caused to accelerate and ionize the gaseous atmosphere, thereby creating positive ions which are induced to migrate toward the workpiece surface, are accelerated in the cathodic-fall region and are associated with the substrate bombarding with high-kinetic energy by these accelerated ionic species. An ion implantation thus occurs as a result of the thermal chemical interaction of the high-energy particles and the substrate which may be distorted in part by the high-frequency field as will be apparent hereinafter. The elements continue to penetrate deeply into the substrate by virtue of the thermal diffusion and "electrotransportation," the latter expression being used as a convenient term to indicate the migration of ionized or otherwise charged elemental particles under the influence of a strong unidirectional electrical field.

The high-frequency superimposition contemplated in accordance with the present invention, allows uniform heating and diffusion over the desired thermal area. This advantage is attributable to the fact that the superimposition of alternating current or an impulsive electric current (in which the polarity does not reverse) at a frequency above 10 kHz, and preferably above 100 kHz., upon the unidirectional field, produces the thin gaseous discharge substantially uniformly even over the most intricately shaped workpiece surface. This gaseous-discharge layer is relatively thin and is effective to increase the potential gradient between the liquid and substrate to produce the acceleration phenomenon discussed above. When a unidirectional field (direct current) is used alone, any discharge layer which may form on the substrate surface tends to concentrate at the regions of discontinuity, i.e. at corners or edges.

Moreover, it can be noted that direct current alone permits the temperature at the surface of the workpiece to fluctuate widely. By contrast, the superimposition of alternating current upon the direct current provides the generation of violent spark discharges which often occur with direct current alone to cause heating fluctuations, to scale the workpiece or to form pits in the surface thereof.

Finally, superimposition of alternating current has been found to facilitate the de-composition of diffusible components of the electrolyte and ionization thereof and to activate the surface zone. Increase of the potential gradient, as permitted uniformly by superimposition of alternating current on a unidirectional direct-current field, increases the kinetic energy of the particles which impinge upon the substrate.

The above and other objects, features and advantages of the present invention will become more readily apparent from the following description and specific Examples, reference being made to the accompanying drawing in which.

Figure 1:
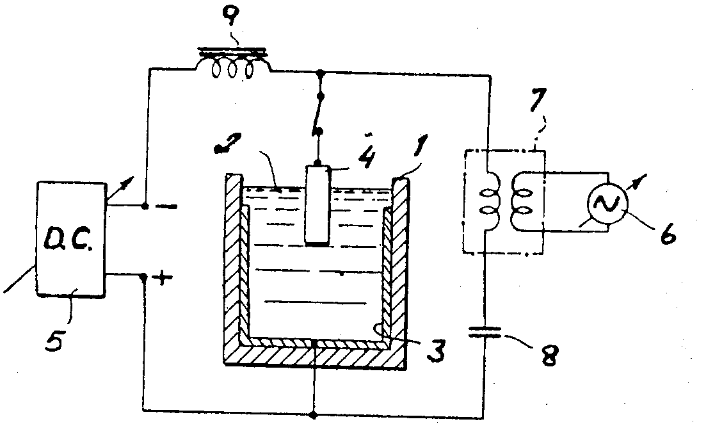
FIG. 1 is a diagrammatic view of an apparatus for carbonizing bodies, in accordance with the present invention.

In FIG. 1 of the drawing, I show a vessel 1 having a conductive lining 3 formed as an anode and receiving an electrolyte 2. The cylindrical vessel 1 surrounds the axially extending conductive body 4 into which elemental penetration is desired. A relatively low-voltage, high current current source 5 is connected across the electrodes 3, 4 so that the workpiece 4 is rendered cathodic. In practice it has been found to be immaterial which pole of the D.C. source is connected to the workpiece since deposition occurs principally by virtue of the thermal energy produced and the potential gradient impelling the ionized particles into the substrate, and the rate of penetration is not as much a function of the rate at which material deposits as it is determined by the ability of the workpiece to permit penetration of the element.

When, for example, carbonates and other corresponding anions are used and the anion contains an element (i.e. oxygen) which is somewhat more electronegative than the element whose diffusion is desired, it has been found to be advantageous to render the workpiece cathodic and thus preferably diffuse carbon, or nitrogen in the presence of oxygen, oxygen being present in most electrolytes in any event.

Figure 2:
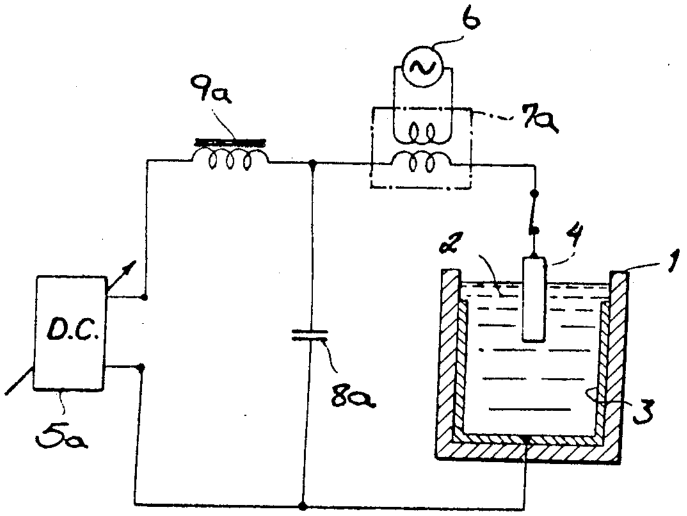
FIG. 2 is a similar view of a modified arrangement.

A high-frequency field is applied across the electrodes 3, 4 via the coupling transformer 7 whose primary is energized by an A.C. source such as the variable-frequency oscillator 6 whose output is in the megacycle range. A D.C. blocking capacitor 8 is connected in series with the secondary winding of the transformer 7 and can, in accordance with a feature of this invention, constitute a series-resonant network, tuned to a preferred supply frequency at which the oscillator 6 can be set. A choke 9 provides the desirable inductive impedance in the D.C. circuit, thereby providing a high reactance to the flow through the D.C. source of the high-frequency alternating current from transformer 7. In the arrangement of FIG 2, the D.C. source **5*a* is connected across the capacitor 8*a* in series with the secondary winding of transformer 7*a*. The arrangement of choke 9*a* and capacitor 8*a* in conjunction with the source 5*a* provides the possibility of discharge through the electrolyte at the rate dependent upon the capacity of condenser 8*a***. This mode of heating, described in my Pat. No. 3,098,151 is applicable here as well. In other respects, however, the system in FIGS. 1 and 2 are similar.

EXAMPLE I

Diffusion of Carbon Into a Metallic Substrate

Figure 3:
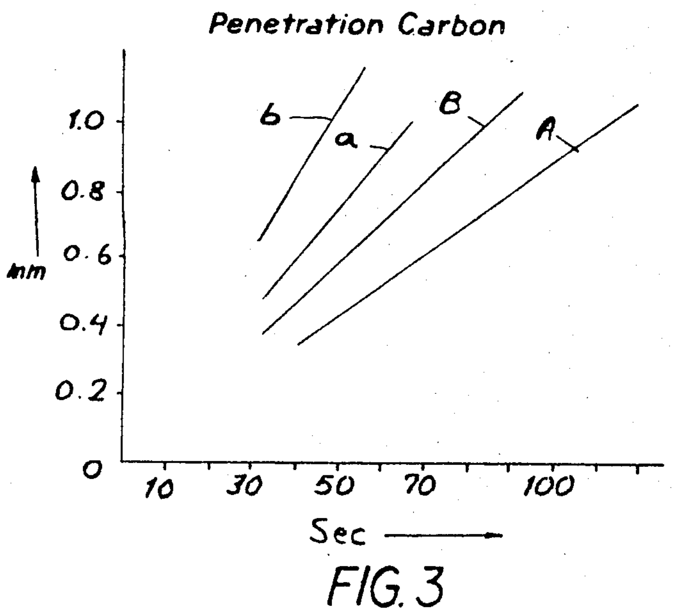
FIG. 3 is a graph showing the depth of penetration of carbon into a steel substrate plotted as the ordinate, against time as the abscissa.

A 0.15%-carbon steel rod 4 of 10-mm diameter was immersed in an aqueous solution of potassium acetate, having a specific gravity of 1.18, to a depth of 2.5 mm. The electrolyte temperature was 35° C. and a cylindrical counterelectrode 3 was spaced from the workpiece by radical distance of 20 cm. A direct-current voltage of 70 v. was applied between the counter-electrode 3 and the workpiece 4 and a current of 8 amp. passed therebetween with a current density of 3 amp. per $cm^2$. The workpiece is thereby raised to a temperature of 100° C. with an immeasurably higher temperature at the interface at which a discharge gas layer was formed across which a potential gradient of $10^6$ volts·cm. is found. The depth of penetration of carbon into the workpiece in millimeters versus treatment time in seconds is shown by curve A of FIG. 3. Sodium carbonate and sodium bicarbonate can be substituted for the potassium acetate, in equivalent concentrations, with similar results.

EXAMPLE II

The method of Example I was carried out except that a high-frequency alternating current of 3 megacycles per second (3 mHz.) was applied by the source 6 across the electrode 3 and the workpiece 4. The A.C. current was 3 amp. and the A.C. voltage was 10 to 20 volts. The penetration vs. time is indicated by curve *a* of FIG. 3.

EXAMPLE III

The workpiece of Example I was used except that the initial temperature of the electrolyte was 85° C. and a D.C. voltage of 90 volts was applied between the workpiece and the counterelectrode. A current density of 4 amp./$cm.^2$ and a total current of 13 amp. was employed. The workpiece is raised to a temperature of about 800° C. along its surface. The carbon penetration vs. time is illustrated in curve B of FIG. 3.

EXAMPLE IV

A 3-megacycles-per-second (3 mHz.) high-frequency alternating current (3 amp., 10 to 20 volts) is superimposed upon the current supplied in Example III. Depth of penetration of carbon vs. time is shown in graph *b* of FIG. 3.

EXAMPLE V

Figure 5:
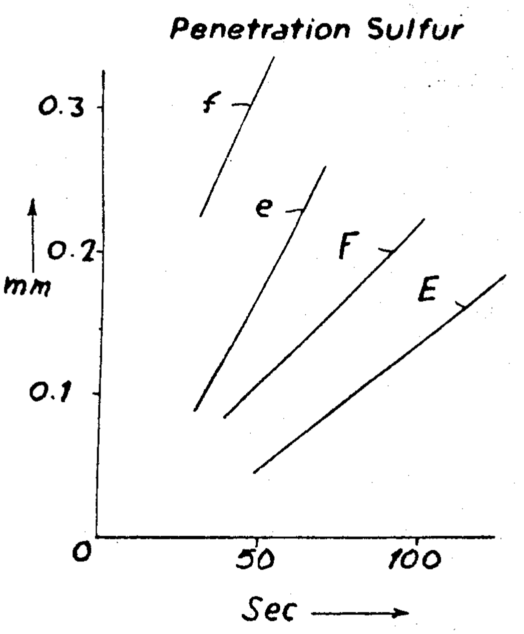
FIG. 5 is another graph illustrating the results of sulphurization process, according to the present invention.

Diffusion for Sulphur Into Steel 5 to 10 mm. of a 0.07%-carbon-steel rod having a width of 5 mm. and a thickness of 10 mm. was immersed in an electrolyte consisting of aqueous sodium thiosulfate having a specific gravity of 1.20. The electrolyte temperature was 70° C. and a D.C. voltage of 90 volts at 9 to 10 amps. was applied across the electrode and the workpiece; the latter is thereby brought to a temperature of 100° C. with a higher temperature at the interface. The depth of sulphur penetration vs. time is indicated in curve E of FIG. 5. When equivalent concentrations of ammonium sulphide and methyl mercaptan were substituted for the sodium thiosulfate, similar results were obtained.

EXAMPLE VI

The method of Example V was carried out with an electrolyte temperature of 40° C. and a voltage of 110 volts with a current of 11–13 amp. The temperature at the workpiece surface is 800° C. The sulphur-penetration results are shown in curve F of FIG. 5.

EXAMPLE VII

The method of Example V is followed except that an alternating current of 3 megacycles per second (3 mHz.), 10 to 20 volts and 5 amp. was superimposed upon the direct current of that example. The sulphur-penetration results are illustrated in curve *e* of FIG. 5.

EXAMPLE VIII

The Example VI is carried out with an alternating-current superimposition as recited in Example VII. The results obtained for sulphur penetration are those illustrated in curve *f* of FIG. 5.

EXAMPLE IX

Nitrogen Diffusion Into Steel

The electrolyte consisted of an aqueous solution of urea (specific gravity 1.15) although ammonia solutions and ammonium nitrate were also found to be suitable in equivalent concentrations. The nitrogen-penetration results are shown in curve C of FIG. 4. They were obtained when the workpiece of Example V was treated with a voltage of 250 volts. The electrolyte temperature was 95° C. and, at a D.C. current of 3 to 4 amp., a temperature of 100° C. was obtained.

EXAMPLE X

When the electrolyte temperature of Example IX was 95° C. a voltage of 320 volts with a current of 4.5 amp. resulted in a workpiece temperature of 750° C. The nitrogen-penetration results obtained were those illustrated in curve D of FIG. 4.

EXAMPLE XI

Figure 4:
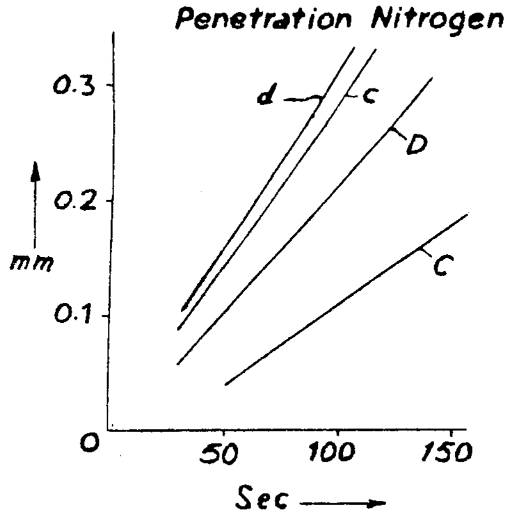
FIG. 4 is a similar graph illustrating nitrification of a substrate.

When 3-megacycle alternating current (10 to 20 volts, 3 amps.) was superimposed on the direct current of Example IX, a nitrogen penetration as illustrated in curve *c* of FIG. 4 was obtained.

EXAMPLE XII

The high-frequency alternating current of Example XI was used with the system of Example X, the results obtained being illustrated in curve *d* of FIG. 4.

From each of the graphs (FIGS. 3–5), it will be seen that the respective small-letter curve (*a, b, c, d, e, f*) has generally a greater slope and a higher value for its intercepts than the corresponding capital-letter curve (A, B, C, D, E, F), thereby indicating that the rate of penetration of the respective elements into the surface zones of the substrate is significantly greater when a high-frequency alternating current is used in addition to the direct current. It is also apparent that the total penetration is greater after a given process time when high-frequency A.C. is used. Surprisingly, the high-frequency signal yields results far better than those obtainable when a similar amount of D.C. power is added by increasing the direct-current amplitude.

I claim:

1. A method of diffusing a substance into a conductive body, comprising the steps of immersing said body in a conductive liquid containing a material dissociatable or decomposable into an ionic species comprising said substance;

spacedly juxtaposing said body with a counterelectrode immersed in said liquid;

passing a direct electric current through said liquid between said body and said counterelectrode to effect a drift of the substance toward a surface of the body immersed in said liquid, thermally generating a gaseous discharge layer between said liquid and said surface, generating electric discharges through said layer to induce the drift of said substance in the form of said ionic species into a surface zone of said body, and applying a potential gradient across said layer of a magnitude sufficient to cause said ionic species to diffuse into said surface zone; and promoting the diffusion of said substance into said surface zone of said body by superimposing upon said direct electric current a high-frequency electric field with a frequency upwards of 10 kHz to the order of about 19 mHz.

2. A method of diffusing a substance into a conductive body, comprising the steps of immersing said body in a conductive liquid having said substance distributed therein;

spacedly juxtaposing said body with a counterelectrode immersed in said liquid;

passing a direct electric current through said liquid between said body and said counterelectrode to effect a drift of the substance toward the surface of the body immersed in said liquid, thermally generating a gaseous discharge layer between said liquid and said surface, generating electric discharges through said layer to induce the drift of said substance in the form of ionic species into a surface zone of said body, and applying a potential gradient across said layer of a magnitude sufficient to cause said ionic species to diffuse into said surface zone; and promoting the diffusion of said substance into said surface zone of said body by superimposing upon said direct electric current a high-frequency electric field with a frequency upwards of 10 kHz. to the order of about 10 mHz., said substance being incorporated in a compound soluble in said liquid and thermally decomposable at the surface of said body to release said substance at the temperature of said layer.

3. The method defined in claim 2 wherein said liquid is an electrolyte and said compound is a salt dissociated into positive and negative ions in said liquid.

4. The method defined in claim 3 wherein said substance is an element diffusible into a surface zone of said body and selected from the group which which consists of nitrogen, carbon, sulfur, boron, vanadium, tungsten and molybdenum.

5. The method definde in claim 2, wherein said high-frequency field is alternating current.

6. The method defined in claim 2 wherein said high-frequency field has a frequency upwards of 100 kHz.

7. The method defined in claim 6 wherein said high-frequency field has a frequency between 500 kHz. and 10 mHz.

8. The method defined in claim 2 wherein said conductive body is composed of a ferrous metal.

9. A method of diffusing a substance into a conductive body, comprising the steps of immersing said body in a conductive liquid having said substance distributed therein;

spacedly juxtaposing said body with a counterelectrode immersed in said liquid;

passing a direct electric current through said liquid between said body and said counterelectrode to effect a drift of the substance toward a surface of the body immersed in said liquid, thermally generating a gaseous discharge layer between said liquid and said surface, generating electric discharges through said layer to induce the drift of said substance in the form of ionic species into a surface zone of said body, and applying a potential gradient across said layer of a magnitude sufficient to cause said ionic species to diffuse into said surface zone; and
promoting the diffusion of said substance into said surface zone of said body by superimposing upon said direct electric current a high-frequency electric field with a frequency upwards of 10 kHz. to the order of about 10 mHz., said liquid containing a solvent selected from the group which consists of water, formic acid, acetic acid, lauric acid, methanol, dodecanol, isoamylalcohol, ethylene, glycol, glycerin, polyethylene glycol, paraldehyde, acrylic acid, acrylalcohol, acetone, acetonylalcohol, acetophenone and methylethylketone, methyl sulfied, ethyl sulfied, formaldehyde, formamide, dimethylformamide, methylamine, aniline, methylaniline, dimethylaniline, amylamine and phosphoric acid.

10. A method of diffusing a substance into a conductive body, comprising the steps of
immersing said body in a conductive liquid having said substance distributed therein;
spacedly juxtaposing said body with a counterelectrode immersed in said liquid;
passing a direct electric current through said liquid between said body and counterelectrode to effect a drift of the substance toward a surface of the body immersed in said liquid, thermally generating a gaseous discharge layer between said liquid and said surface, generating electric discharges through said layer to induce the drift of said substance in the form of ionic species into a surface zone of said body, and applying a potential gradient across said loyer of a magnitude sufficient to cause said ionic species to diffuse into said surface zone; and
promoting the diffusion of said substance into said surface zone of said body by superimposing upon said direct electric current a high-frequency electric field with a frequency upwards of 10 kHz. to the order of about 10 mHz., said liquid containing a solute selected from the group which consists of potassium acetate, ammonium acetate, calcium acetate, potassium formate, sodium formate, ammonium, formate, potassium oxalate, sodium oxalate, potassium carbonate, sodium carbonate, potassium chloride, sodium chloride, ammonium chloride, potassium nitrite, potassium nitrate, sodium nitrite, sodium nitrate, potassium silicate, sodium silicate, potassium silicofluoride, sodium silicofluoride, sodium sulfate, formic acid, oxalic acid, tartaric acid, citric acid, phosphoric acid, urea, ammonium sulfate, methyl mercaptan, thiosulfate salts, hydrogen sulfide, sulfonic acids, sodium metavanadate, sodium tungstenate, sodium molybendate, ethanol, glucose, saccharose, and maltose.

11. A method of diffusing a substance into a conductive body, comprising the steps of:
disposing said body in contact with a conductive liquid containing a material dissociatable or decomposable into an ionic species comprising said substance;
spacedly juxtaposing said body with a counterelectrode in contact with said liquid;
passing a direct electric current through said liquid and said body and counterelectrode with a voltage and current intensity sufficient to generate a gaseous arc discharge layer at the surface of said body and between said surface and said liquid;
effecting an electric discharge in said layer to thermally decompose said material and produce particles of said substance in the form of activated ionic species responsive to a potential gradient, while maintaining a potential gradient across the gaseous layer sufficient to cause said ionic species to diffuse into a surface zone of said body; and
promoting the diffusion of said substance into said surface zone by superimposing upon said direct current a high-frequency electric field with a frequency between substanctially 10 kHz. and 10 mHz.

12. A method of diffusing a substance into a conductive body, comprising the steps of disposing said body in contact with a conductive liquid containing a compound soluble therein and thermally decomposable at the surface of said body to release said substance; spacedly juxtaposing said body with a counterelectrode in contact with said liquid; passing the direct electric current through said liquid and said body and counterelectrode with a voltage and current intensity to generate a gaseous arc-discharge layer at the surface of said body and between said surface and said liquid, said gaseous arc discharge layer sustaining an electric discharge producing a temperature sufficient to thermally decompose said compound and producing ionic species containing said substance; maintaining a potential gradient across said layer sufficient to cause said ionic species to diffuse into a surface zone of said body; and promoting the diffusion of said substance into said surface zone by superimposing upon said direct current a high-frequency electric field with a frequency between substantially kHz. and 10 mHz.

13. The method defined in claim 12 wherein said liquid contains a solvent selected from the group which consists of water, formic acid, acetic acid, lauric acid, methanol, dodecanol, isoamylalcohol, ethylene glycol, glycerin, polyethylene glycol, paraldehyde, acrylic acid, acrylalcohol, acetone, acetonylalcohol, acetophenone and methylethylketone, methyl sulfide, ethylsulfide, formaldehyde, formamide, dimethylformamide, methylamine, aniline, methylaniline, dimethylaniline, amylamine and phosphoric acid.

14. The method defined in claim 12 wherein said liquid contains a solute selected from the group which consists of potassium acetate, sodium acetate, ammonium acetate, calcium acetate, potassium formate, sodium formate, ammonium formate, potassium oxalate, sodium oxalate, potassium carbonate, sodium carbonate, potassium chloride, sodium chloride, ammonium chloride, potassium nitrite, potassium nitrate, sodium nitrite, sodium nitrate, potassium silicate, sodium silicate, potassium silicofluoride, sodium silicofluoride, sodium sulfate, formic acid, oxalic acid, tartaric acid, citric acid, phosphoric acid, urea, ammonium sulfate, methyl mercaptan, thiosulfate salts, hydrogen sulfide, sulfonic acids, sodium metavanadate, sodium tungstenate, sodium molybdenate, ethanol, glucose, saccharose, and maltose.

References Cited

UNITED STATES PATENTS 3,503,860 3/1970 Inoue .............. 204—181

HOWARD S. WILLIAMS, Primary Examiner

U.S. Cl. X.R.

204—56 R